July 2, 1929.  L. HAMMOND  1,719,805
ALTERNATING CURRENT CLOCK
Filed May 20, 1929   2 Sheets-Sheet 1
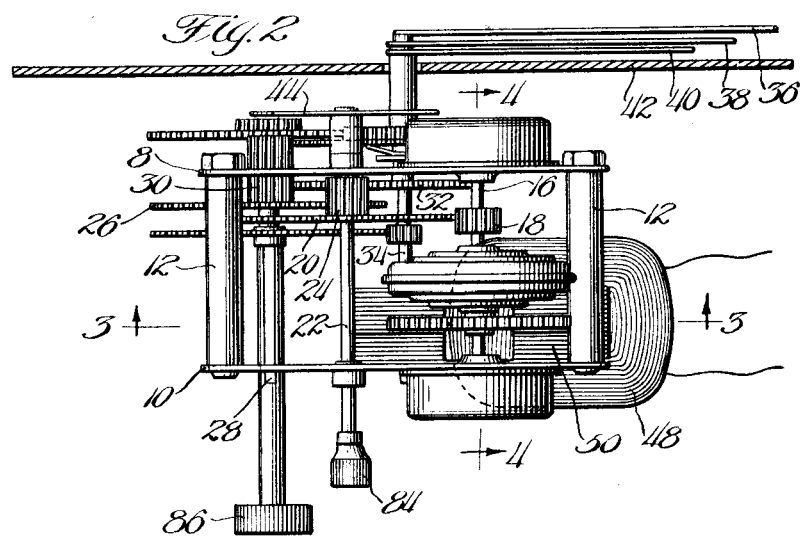
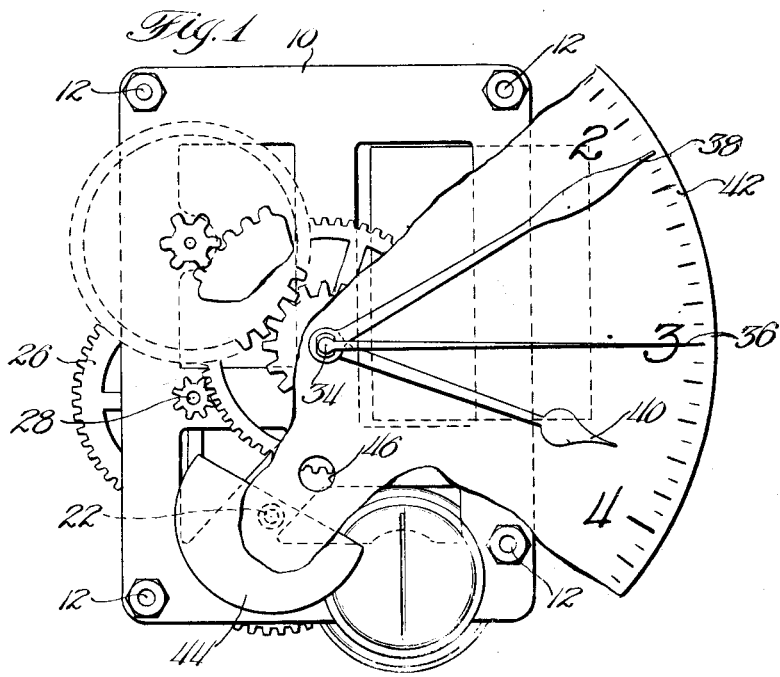
Inventor:
Laurens Hammond
By Williams, Bradbury, McCaleb & Hinsdale
Attys.

July 2, 1929.  L. HAMMOND  1,719,805
ALTERNATING CURRENT CLOCK
Filed May 20, 1929   2 Sheets-Sheet 2
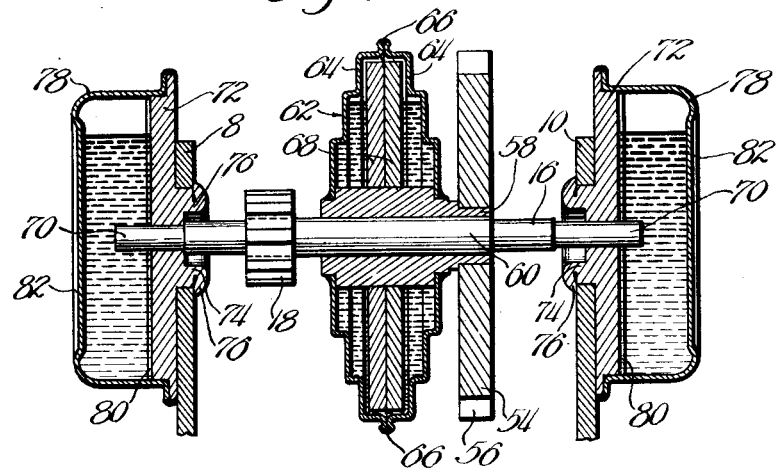
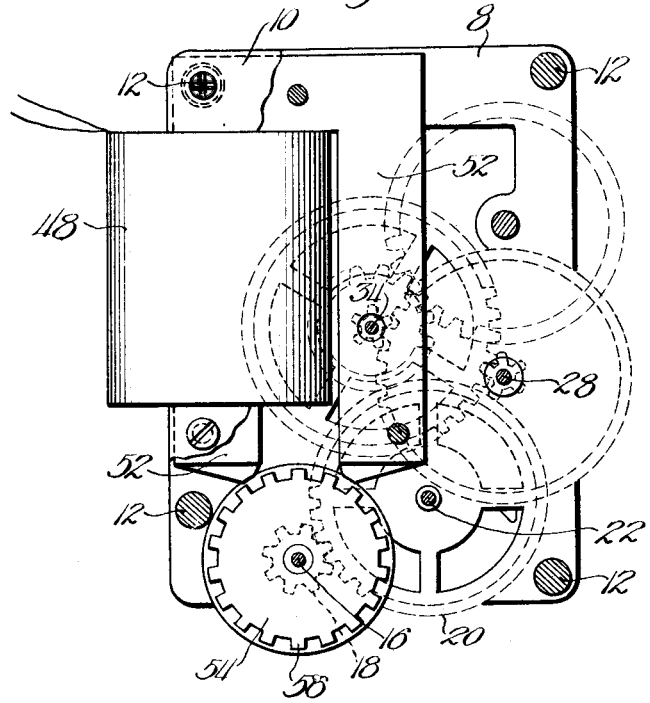
Inventor:
Laurens Hammond
By Williams, Bradbury, McCaleb & Hinkle
Attys.

Patented July 2, 1929.

1,719,805

UNITED STATES PATENT OFFICE.

LAURENS HAMMOND, OF WINNETKA, ILLINOIS, ASSIGNOR TO THE HAMMOND CLOCK COMPANY, OF CHICAGO, ILLINOIS, A CORPORATION OF ILLINOIS.

ALTERNATING-CURRENT CLOCK.

Application filed May 20, 1929. Serial No. 364,480.

My invention relates generally to electric clocks and more particularly to clocks adapted to be driven directly by the alternating current supplied to consumers for electric light and power service.

It has recently become the practice for electric power companies to supply alternating current of accurately regulated frequency for general distribution. While the frequency of the current supplied may vary slightly from minute to minute, the frequency is governed so that the total number of alternations per given period, such as an hour, is exactly uniform. Thus, for example, in the power supplied the frequency may vary slightly above and below 60 cycles per second but the average number of cycles per second will be maintained at 60. A synchronous motor driven clock supplied with current from a source at which the frequency is thus carefully regulated, may be made to indicate the correct time excepting only such slight discrepancies as may result from slight variations in the frequency of the current. With present equipment and control mechanism, this variation is not cumulative, so that the inaccuracies in time indication by synchronously driven clocks is so small as to be of negligible importance in clocks used for ordinary purposes.

Synchronous motor driven clocks of a type adapted to be used in systems as above described have been known and in use for a long time. My invention consists of the improvement of clocks of this type to make them more reliable, more simple in construction and less liable to be affected by variations in the current supply.

It is a primary object of my invention to provide an improved non-self-starting synchronous motor driven time indicating device which may be easily manually started and which, if started at a speed higher than synchronous speed, will, as it drops to syncronous speed, automatically get in step and thereafter maintain its exact synchronous speed.

A further object is to provide an improved synchronous motor which, although not self-starting, may easily be manually started.

A further object is to provide an improved synchronous motor which, if launched at a speed greater than the synchronous speed by an external source of power, will, as it slows down to the synchronous speed, fall into step and continue in operation at synchronous speed.

A further object is to provide an improved inertia means applicable to the rotor of a synchronous motor which will be effective to aid in maintaining the rotor at synchronous speed.

A further object is to provide an improved synchronous motor in which an improved form of friction inertia means having a coefficient of friction varying with the relative speed between the rotor and inertia means, is utilized.

A further object is to provide an improved synchronous motor having an inertia member loosely coupled to the rotor of the motor by a frictional hydraulic means.

Other objects will appear from the following description, reference being had to the accompanying drawings, in which Fig. 1 is a front elevation of my improved clock mechanism, portions of the dial and gears being broken away to show the underlying parts;

Fig. 2 is a bottom plan view thereof, with the dial shown in section;

Fig. 3 is a vertical sectional view taken on the line 3—3 of Fig. 2; and

Fig. 4 is an enlarged vertical section taken on the line 4—4 of Fig. 2, showing particularly the rotor and the rotor inertia member.

As best shown in Figs. 1 and 2, the clock of my invention comprises the usual front and rear frames 8 and 10 which are held in spaced relation by four bolts 12. The clock is driven by a synchronous motor, hereinafter described in detail, which has a shaft 16 carrying a driving pinion 18. The pinion 18 meshes with a gear 20 rigidly mounted on a shaft 22. The shaft 22 also carries a pinion 24 which meshes with a gear 26 carried on a shaft 28. A pinion 30, rigidly secured to the gear 26, meshes with a gear 32 carried on a shaft 34 which is journaled in the frames 8 and 10 and at its forward end carries a second hand 36. The minute hand 38 and hour hand 40 are suitably driven through a train of gearing which derives its power from the shaft 34, as is well known in the art. The hands 36, 38 and 40 register with a suitable dial 42 which may be supported by the frame 8 or by the casing of the clock in any suitable manner.

Rigidly secured to the forward end of the rotating shaft 22 is a segmental disc 44 which is visible through a suitable aperture 46 in the dial 42, and thus comprises a flashing indication that the clock is operating.

The motor comprises a coil 48 wound about one leg of a laminated substantially U-shaped core 50 which is suitably bolted to the frame 10. A plurality of the laminations of the core 50 project upwardly to form a pair of pole pieces 52 which extend into close propinquity with the periphery of a magnetic rotor 54. The rotor 54 has a plurality of regularly spaced radial projections 56 which are so spaced that two non-adjacent projections may lie in substantial registry with the pole pieces 52 at one time.

The rotor 54 is pressed over the reduced end of a non-magnetic sleeve or hub 58 which in turn is secured over the enlarged portion 60 of the shaft 16. The sleeve 58 forms the hub for a casing 62 formed in two halves 64 which are soldered together at their peripheries at 66 and also to the hub 58. Within the casing 62 is a pair of non-magnetic washers or inertia members 68 which are mounted for free rotation relative to the hub 58 and relative to each other. The casing 62 is filled, either completely or partially, with oil or other suitable semiviscous liquid. This liquid not only forms a "frictional connection" between the washers 68 and the casing but its mass also adds to the inertia of the members 68 and has an effect similar to that of the washers. In fact, I have found that the washers 68 may be omitted and liquid only used as the inertia substance in the casing, with satisfactory results. Thus when I hereinafter refer to an "inertia member" which is frictionally coupled with the rotor shaft, I wish it to be understood that I include not only such means as the washers 68 but also oil or other fluid which will normally be moved by the shaft but which is capable of independent motion, and other equivalent means.

The ends of the shaft 16 have portions 70 of reduced diameter which are journaled in suitable bearings formed in plates 72. The bearing plates 72 have sidewardly extending bosses 74 which project into suitable apertures formed in the frames 8 and 10 and are riveted to the frame by having a flanged portion 76 extending from the boss 74, swaged or riveted against the frame.

Cup shaped oil reservoirs 78 are suitably secured to the bearing plates 72 by having their brims pressed over and soldered to the plates. The plates 72 have vertical grooves 80 of capillary dimensions formed in their outer faces. These grooves serve as oil ducts to insure a continuous supply of lubricant to the end bearings of the shaft 16 as long as any oil remains in the reservoirs.

The reservoirs 78 preferably have vertical grooves 82 depressed therein. The reservoirs, together with the bearing plates 72, are assembled with the grooves 80 and 82 in alignment so that these sub-assemblies may readily be secured to the frames in such position that the grooves 80 are vertical.

The shaft 22 at its rearward end has a suitable thumb nut 84 by which the clock may be manually started. The hands of the clock may be set by a suitable thumb nut 86 which is connected to the hands through the usual means.

In order that the clock may be easily started, it is necessary that a peculiar relationship exist between (1) the energy or force required to pull the rotor "out of step", (2) the frictional resistance to motion of the inertia members relative to the shaft 16, and (3) the frictional resistance of the load which comprises the friction in the time gear train and the friction at the end bearings of the shaft 16.

The total friction (3) of the load and of the bearings of the shaft 16 should be less than the friction (2) between the inertia members 68 and the shaft 16, and the friction (2) between the inertia members 68 and the shaft 16 should be less than the force (1) required to pull the rotor out of step. Naturally the frictional resistance (3) of the load must be less than the force (1).

The relationships above-described constitute one of the essential features of my invention. I am aware that it has been proposed and is old in the art to have an inertia member frictionally driven by a synchronous motor or other prime mover which runs at a speed alternately greater and less than an average running speed. Such synchronous motors or other prime movers, which may vary in speed in a manner usually referred to as hunting, have been equipped with inertia members driven by friction means for the purpose of preventing such hunting. In these prior arrangements the frictional work done between the prime mover and the inertia member is work which is done at the expense of the forces tending to produce hunting. If such arrangements were to be made to synchronous motors for such purpose, it is obvious that the internal frictional work done in the anti-hunting devices should be small compared to the useful work done on the load of the motor. The same would of course apply to similar anti-hunting devices used on automobile engines and the like.

In the clock of my invention I have made use of a similar device except that the constants involved have been so modified as to produce a different result from that obtained in these other devices. The frictional work done in the clock train, as well as in the bearings of the motor, constitutes the only load on the motor and if the parts are properly proportioned it is possible to make the frictional torque between the inertia member and the rotor greater than the total load, and still not fix the inertia members so rigidly to the rotor that occasional relative motion between the two results, in the process of starting and synchronizing the clock and in cases of sudden electrical disturbances or brief interruptions of the power supply. This will be made clearer in the following description of the operation of the motor.

The alternating current passing through the coil 48 produces a magnetic flux in the core 50, the flux circuit of which is completed through the pole pieces 52 and portions of the armature or rotor 54. This flux varies in density and direction in accordance with the current flow through the coil 48. The projections 56 on the periphery of the rotor 54 are successively attracted toward the stationary pole pieces 52 during normal running at synchronous speed. The operation of motors of this type is old and well known and need not be further explained herein. This type of motor is not self-starting and when it is not equipped with my improved inertia and friction device it is difficult to start and is also unsatisfactory in other ways. With some practice it is possible to start such a motor manually, provided that it is caused to rotate at the exact synchronous speed at which it will run thereafter and is left running in a position which may be said to be "in step". If such a motor is manually launched to a speed greater than synchronism and then allowed to slow up of its own accord, it will not remain running at synchronous speed although it obviously must have been running at exactly the right speed at some time during this operation. This is because at the instant when it was running at the exact synchronous speed it was not "in step". If such a motor is launched, it will not necessarily continue to run indefinitely because of the fact that disturbances in the power supply, such as harmonics, and surges on commercial lighting lines, may cause it to hunt to such an extent that it will fall out of step and suddenly stop.

The use of that type of motor in synchronous clocks is old and is not claimed by me except in conjunction with my improved frictional inertia device.

When such a motor is equipped with the frictionally driven inertia member as described heretofore and the friction between the rotor and the inertia member is made greater than the torque of the load which itself has little inertia, the behavior on starting is entirely different. To start the motor under these circumstances, it is only necessary to impart to it by manual means a speed of revolution greater than synchronous speed. The friction between the rotor and inertia member is great enough so that during this manual impulse not only the rotor, but also the inertia member, is caused to revolve at a speed greater than synchronism. When the motor now starts to slow up and approach synchronous speed, it falls into step with a sudden motion in which slipping occurs between the rotor and inertia member, whereupon internal frictional work is done, and this work is greater than the work of the total load during the same interval of time. The theory is amply borne out by the fact that in practice the motors of my invention invariably start from superspeed, whereas motors of the same type, without this device, do not.

I am of course aware of the fact that it has been proposed to make synchronous motor driven clocks which will come into synchronism when launched at a speed greater than synchronism, by means of inertia members, the moment of inertia of which is variable, but such devices come into synchronism only when there happens to be a specific position of the members at the instant the rotor falls into step, whereas the inertia member of my invention is always in position to assist the rotor to come into step.

The motor herein described will also come into synchronism and continue to operate if launched at a speed slightly less than synchronous speed. The inertia and friction members 68 will also have an effect in maintaining the rotor in step when there are short interruptions in the supply of current, and during such brief interruptions the momentum of the inertia members, together with the fact that the friction between these members and the shaft is greater than the load, enable them to carry the load during the brief interruption.

It will be noted that the friction between the members 68 and the rotor shaft 16 is not constant but increases with the difference in speed between these members and the shaft, due to the fact that the greater part of the friction is caused by the skin friction and internal friction of the liquid contained in the casing 62. Thus, upon a slight acceleration of the rotor, the energy dissipated and the torque furnished by the rotor to the members 68 and the liquid within the casing 62 will be an extremely small amount, but as the acceleration of the rotor becomes greater the energy thus lost by friction, and consequently the torque applied to the inertia members, will be very much greater; and conversely, if the rotor tends to decelerate rapidly the energy which will be returned to the rotor shaft from the inertia members 68 will be correspondingly very great, while for a slight deceleration of the rotor the energy returned to the rotor by the inertia members 68 will be correspondingly very slight. This type of frictional connection between the rotor shaft and the inertia member is a substantial factor in making the clock of my invention so easy to start and in making the motor keep in step so perfectly. Since the thumb piece 84 is geared to the rotor shaft so that slow rotation of the former will cause rapid rotation of the latter, a single twirl of the thumb piece will impart to the inertia member, due to the particular type of its frictional connection with the rotor shaft, a speed of rotation sufficient so that the momentum or inertia of the inertia member will be capable of driving the rotor and the load at a speed above synchronism.

A practical and simple test for determining the proper values of friction and power may be made in the following manner: With the current shut off and all parts at rest, turning the inertia member by an outside force will revolve the rotor and the entire gear train. With the current turned on and all parts at rest, the rotor will be automatically locked into one position and the inertia member may be revolved from an outside source without causing any other members to move, provided that this is not done too rapidly.

Various constructional details disclosed in this application are not claimed herein but are described and claimed in other co-pending applications filed by me.

The invention is capable of wide variation within equivalent limits and I contemplate such variation as may be desirable or useful in the particular adaptation of the invention shown, or in its adaptation to other devices.

I do not restrict myself in any unessential particulars, but what I claim and desire to secure by Letters Patent is:

1. In a time-keeping device having a gear train, a synchronous motor having a rotor, and an inertia element frictionally connected to the rotor, the torque due to friction between said element and said rotor being sufficient to drive the gear train but insufficient to drive said train and to move said rotor out of step, the values of the inertia, the load and the frictional torque being such that when said rotor is launched at a speed greater than synchronous speed it will automatically start operation at synchronous speed when it slows down to said speed.

2. The combination of a non-self-starting synchronous motor having a rotor and a load of relatively small friction and small inertia, and an inertia element frictionally connected to said motor, the torque due to friction between said inertia element and said rotor being greater than the load and the friction of the motor, the values of the inertia, the load and the frictional torque being such as to cause the rotor to come into synchronism when launched at a speed greater than synchronism.

3. In an alternating current clock having a gear train, the combination of a synchronous motor having a rotor for driving the gear train, pole pieces for said rotor, means to produce a varying flux across said pole pieces, an inertia member rotatable relative to said rotor, and friction means normally tending to prevent such relative rotation, said friction means having a coefficient of friction sufficiently high and an area of contact sufficiently great so that said member may transmit enough of its energy to said train to drive the latter at substantially synchronous speed during brief current interruptions.

4. A synchronous motor comprising a rotatable armature, a shaft geared to said armature so as to rotate at a substantially lesser speed, manually engageable means for rotating said shaft, and a friction and inertia device adapted to be rotated by said armature or by said manually engageable means, the inertia of said device and the coefficient of friction between it and said armature being sufficient to permit said device to drive said armature at substantially synchronous speed for a brief interval, whereby said device may be brought to a speed higher than the synchronous speed of said armature by a single manual operation of said means and the coefficient of friction being of such value that said device and said armature will decelerate at substantially the same speed, the only substantial deviation in the speeds of said device and armature occuring as the armature first reaches substantially synchronous speed.

5. In a time-keeping device having a gear train, the combination of a synchronous motor operable from a commercial source of alternating current and having a shaft with portions of small diameter at its extremities, bearings for said portions, a magnetic, substantially circular rotor having teeth formed thereon, a pinion secured to said shaft for driving said train, a circular inertia member mounted on said shaft and rotatable relative to said rotor, and means for causing more friction between said inertia member and the rotor than exists in said bearings.

6. In a time-keeping device comprising a gear train, the combination of a synchronous motor operable from a commercial source of alternating current for driving said train, said motor having an armature shaft with portions of different diameters, bearings for receiving the portions of smaller diameter, and an inertia member rotatably and frictionally mounted upon the portion of larger diameter, the quantitative relationship between said elements being such that the friction of said shaft in said bearings constitutes an appreciable portion of the load of said motor, and the frictional torque of said inertia member is greater than the torque due to the friction of said bearings and of said train.

7. In a time-keeping device comprising a gear train, the combination of a synchronous motor operable from a commercial source alternating current driving said train, said motor having an armature shaft, bearings therefor, and an inertia member mounted on said shaft and movable relative thereto, the mounting of said member being such that the energy capable of being dissipated by friction upon movement of said member relative to said shafts is greater than the energy lost in friction in said shaft bearings and in said gear train.

8. In a time-keeping device comprising a gear train, the combination of a synchronous motor operable from a commercial source of alternating current connected to said train, said motor having a rotor, a support therefor, and an inertia member normally rotating with said rotor but capable of angular displacement relative thereto, the torque due to the friction between said rotor and said member being greater than the combined torque due to friction between said rotor and its support and the friction of said train.

9. In a time-keeping device having a gear train and adapted to be driven directly from an alternating current source the combination of non-self-starting synchronous motor having a rotor adapted to drive the gear train, a manually engageable member geared to said rotor, the gear ratio between said member and said rotor being sufficiently great so that when said member is manually twirled at a speed easily obtainable by a single manual operation the speed of said rotor will be above its synchronous speed, and inertia means frictionally connected to said rotor, the quantitative relationship between said means, the load imposed by said gear train, and the magnetic forces acting on the rotor being such as to cause said rotor to fall into step and continue operation at its synchronous speed when it arrives at said speed due to deceleration caused by the load.

10. In an electric clock having a time gear train and adapted to be driven directly from an alternating current source, the combination of a non-self-starting synchronous motor having a rotor, a manually engageable member geared to said rotor, the gear ratio between said member and said rotor being sufficiently great so that when said member is manually operated at a speed easily obtainable by a single operation, the speed of rotation of said rotor will be above its synchronous speed, an inertia element rotatable relative to said rotor, and a frictional driving connection between said element and said rotor, the quantitative relationship between said connection, the inertia of said element, and the load imposed by said gear train being such that said rotor will automatically fall into and maintain its synchronous speed as it slows down from the speed above synchronism at which it was launched.

11. In an electric clock having a time gear train and adapted to be driven directly from an alternating current source, a non-self-starting synchronous motor having a rotor, means actuated by a single manual operation for imparting to said rotor a speed greater than its synchronous speed, an inertia element rotatable relative to said rotor, and a liquid forming a frictional driving connection between said element and said rotor, said connection having sufficient friction at the speeds which are attained so that said rotor will fall into step and continue operation at synchronous speed as it slows down from the greater speed at which it is manually launched.

12. In an electric clock having a gear train and adapted to be driven directly from an alternating current source, a non-self-starting synchronous motor having a rotor, means actuated by a single manual operation for imparting to said rotor a speed greater than its synchronous speed, an inertia element rotatable relative to said rotor, and a liquid forming a frictional driving connection between said element and said rotor, said connection being capable of transmitting sufficient energy from said element to said rotor to drive said rotor and the gear train at substantially synchronous speed during a brief interruption in the supply of current from said source.

13. In an alternating current clock having a time gear train, the combination of a synchronous motor having a rotor for driving said train and adapted to be driven from a commercial source of alternating current, and an inertia element frictionally connected to said rotor and movable relative thereto, the friction between said rotor and said element being greater than the total friction of the rotor and said train.

14. In an alternating current time-keeping device having a gear train, a synchronous motor for driving said train, said motor having a rotor, and an inertia element frictionally connected to said rotor, the friction between said element and said rotor being sufficient to drive said train when said element rotates relative to said rotor at the speed obtained when the rotor decelerates from super-synchronous to synchronous speed due to the load.

15. In a time keeping device having a load of relatively small inertia and a small amount of friction, a synchronous motor for driving said load, said motor comprising a magnetic rotor, pole pieces therefor, means to produce a varying flux across said pole pieces, an imperforate casing fixed relative to said rotor, an inertia element and a liquid both confined within and movable relative to said casing, said element having sufficient inertia and said liquid causing sufficient friction so that said element will be capable of driving said rotor and said load at substantially synchronous speed for a short time, and means for manually imparting to said rotor a speed greater than its synchronous speed.

16. In an alternating current clock having a gear train a synchronous motor for driving said train, said motor comprising a rotor connected to said train, and an inertia element frictionally connected to said rotor but movable relative thereto, the friction between said rotor and said element being sufficient at the relative speeds ordinarily obtained to drive said train but insufficient to move said rotor out of step when the latter is operating at synchronous speed.

17. In an alternating current time-keeping device having a gear train, the combination of a synchronous motor having a rotor for driving said train, a casing containing a liquid, said casing being imperforate and rigidly connected to said rotor, a plurality of inertia elements confined within and movable relative to said casing, and means for imparting to said rotor a speed greater than its synchronous speed by a single manual operation.

18. In a time-keeping device having a gear train, a synchronous motor adapted to be driven from an alternating current source and having a rotor for driving said train, an inertia member, and a liquid interposed between said rotor and said member and forming a frictional drive connection therebetween, said member having sufficient inertia and said liquid being capable of transmitting sufficient frictional torque so that said rotor will, upon a brief current interruption, be maintained by said member at a speed sufficiently close to its synchronous speed to enable it to step into synchronous speed after said interruption.

In witness whereof, I hereunto subscribe my name this 16th days of May, 1929.

LAURENS HAMMOND.